United States Patent [19]
Melvin

[11] Patent Number: 5,794,983
[45] Date of Patent: Aug. 18, 1998

[54] CLAMPING SLEEVE FOR PRESSURE HOSES

[75] Inventor: Michael Peter Melvin, Schramberg, Germany

[73] Assignee: Lucas Industries public limited company, Great Britain

[21] Appl. No.: 802,339

[22] Filed: Feb. 11, 1997

Related U.S. Application Data

[63] Continuation of PCT/EP95/03767 Sep. 22, 1995 published as WO96/09488 Mar. 28, 1996.

[51] Int. Cl.⁶ .................................................. F16L 9/14
[52] U.S. Cl. ........................ 285/55; 285/256; 285/330
[58] Field of Search .......................... 285/256, 259, 285/55, 330

[56] References Cited

U.S. PATENT DOCUMENTS

| | | | |
|---|---|---|---|
| 1,839,338 | 1/1932 | Pentz | 285/259 X |
| 2,031,833 | 2/1936 | Hutchinson | 285/256 |
| 2,284,761 | 6/1942 | Nathan | 285/55 X |
| 2,295,830 | 9/1942 | Carlson . | |
| 3,020,068 | 2/1962 | Costanzo | 285/55 |
| 3,409,914 | 11/1968 | Jones | 285/55 X |
| 3,951,438 | 4/1976 | Scales | 285/259 X |
| 4,991,876 | 2/1991 | Mulrey | 285/256 X |
| 5,228,721 | 7/1993 | Whittle et al. . | |

FOREIGN PATENT DOCUMENTS

| | | |
|---|---|---|
| 258524B1 | 3/1988 | European Pat. Off. . |
| 415690A2 | 3/1991 | European Pat. Off. . |
| GM 1825704 | 7/1960 | Germany . |
| 1105671 | 4/1961 | Germany . |
| 4102047C2 | 7/1992 | Germany . |
| 1008033 | 10/1965 | United Kingdom ............ 285/256 |
| 1053629 | 1/1967 | United Kingdom . |

OTHER PUBLICATIONS

International Search Report for PCT Application No. PCT/EP95/03767.

*Primary Examiner*—Dave W. Arola
*Attorney, Agent, or Firm*—Wood, Herron & Evans, L.L.P.

[57] ABSTRACT

A clamping sleeve (12) for joining a pressure hose (14) with a metal braided sheathing with a fitting (10) comprises a tubular metal base member (40) with a first end which faces the fitting (10) and an opposite inlet end. At least in the area of the inlet end, the base member (40) is provided with a hollow cylindrical plastic insert (42) which extends at least to the inlet end of the plastic insert (40) the inner diameter of which in its axially inner end portion with respect to the base member corresponds at least approximately to the inner diameter of the base member (40) in a portion axially adjacent to the plastic insert (42). In the axially outer end portion of the plastic insert (42) the inner diameter of same continuously increases towards the axially outer end in order to prevent notch effects. Due to its low friction coefficient relative to the braided metal sheathing of the pressure hose, the plastic insert (42) provides for a considerably increased life of the pressure hose (14) which is subjected to cyclic stresses.

15 Claims, 1 Drawing Sheet

CLAMPING SLEEVE FOR PRESSURE HOSES

This application is a continuation application based on applicant's copending PCT application Ser. No. PCT/EP95/03767, filed on Sep. 22, 1995.

The invention relates to a clamping sleeve for joining a pressure hose with a braided metal sheathing to a connection fitting, which comprises a tubular metal base member having an end facing the fitting and an opposite inlet end. The invention also relates to a pressure hose with a braided metal sheathing.

Pressure hoses with a braided metal sheathing are primarily employed in hydraulic systems or apparatuses in which a hydraulic connection must be made between parts which are movable relative to each other. In the case of motorcycles, for example, it is common practice to connect a master cylinder which is attached at the handlebar by means of a pressure hose with a braided metal sheathing with the front wheel brake which is usually attached at the lower portion of the front fork of a motorcylce in order to be able to hydraulically actuate the brake piston(s) and thus apply the brake linings to a brake disk which is non-rotatingly attached to the front wheel. In the field of construction machinery, too, pressure hoses with braided metal sheathing are employed, for example in excavators, in order to connect their hydraulically operated piston/cylinder units for lifting and lowering the buckets with a unit for generating the hydraulic pressure, which is centrally arranged in the excavator.

Pressure hoses with braided metal sheathing are also employed in hydraulically operated machine tools which often comprise components which are movable, in particular, rotatable, relative to each other.

In order to join such a pressure hose with metal braided sheathing with a connection fitting a clamping sleeve is generally employed which is to be put on the connecting end of the pressure hose and which, after sliding the pressure hose onto the fitting or the connecting stud, respectively, protruding from the latter is crimped in a radial direction, which results in a pressure resistant crimp connection between the pressure hose and the fitting. A crimp connection of this type with a clamping sleeve is known, for example, from DE 41 02 047 C2 or from EP 0 258 524 B1 as well.

Due to the fact that, as mentioned above, pressure hoses with metal braided sheathing are primarily employed for the hydraulic connection between components which are movable relative to each other, the joint between the pressure hose and the clamping sleeve is subjected to a high mechanical load because of the cyclic stresses of the pressure hose. It has been observed that the metal braided sheathing of the pressure hose has been destroyed primarily in the area of the clamping sleeve, the consequence of this being that the pressure hose becomes leaky.

The invention is based on the object to provide a solution which enables the manufacture of a pressure hose with braided metal sheating ready for connection which has an increased service life under cyclic stresses.

According to the invention, starting with a generic clamping sleeve, this object is solved in that the base member of the clamping sleeve is provided, at least in the region of the inlet end, with an essentially tubular plastic insert extending at least to the inlet end of the base member, the inner diameter of which in its axially inner end portion with respect to the base member in the uncramped condition of the clamping sleeve corresponding at least approximately to the inner diameter of the base member which the latter has in a portion axially adjacent the plastic insert, and the inner diameter of which in its axially outer end portion with respect to the base member continuously increases up to the axially outer end. According to the invention the object is also solved by a pressure hose with a braided metal sheathing which is connected with a fitting by means of the inventive clamping sleeve.

Due to more favourable friction conditions, the plastic insert of the inventive clamping sleeve provides for significantly reduced mechanical stresses acting on the metal braided sheathing of the pressure hose, in particular in the critical inlet area of the clamping sleeve. The durability of the metal braided sheathing and thus of the entire pressure hose is therefore considerably increased.

The inner diameter of the plastic insert is preferably slightly larger from its axially inner end onwards than the inner diameter of the portion of the base member of the clamping sleeve axially adjacent to the plastic insert. This measure provides for a further reduction of the mechanical stresses acting on the metal braided sheathing in the above mentioned critical area of the clamping sleeve without compromising the tightness of the connection.

In an embodiment of the clamping sleeve according to the invention the plastic insert has a circumferential projection which extends radially outward at its axially inner end portion and which engages a correspondingly shaped annular groove in the inner surface of the base member. This configuration of the clamping sleeve ensures a tight fit of the plastic insert in the base member of the clamping sleeve.

In a modified embodiment of the clamping sleeve according to the invention the plastic insert encompasses the inlet end of the base member. This modified embodiment quite reliably prevents damage of the metal braided sheathing even when the pressure hose is severely kinked in the area of the inlet end.

In preferred embodiments of the clamping sleeve according to the invention the axially outer end of the plastic insert is formed as an external hexagon. In this manner it is considerably simpler than with conventional ready for use pressure hoses to rotate the fitting relative to the pressure hose if flats for the application of a tool are formed at the fitting itself as well. A rotation of the fitting relative to the pressure hose is often necessary in order to be able to adapt the ready for use pressure hose to a given assembly situation without twisting the pressure hose itself.

The plastic insert of the inventive clamping sleeve is preferably made from a plastic material which contains inorganic fillers or pigments. Due to the lower friction coefficient of a plastic material of this type the mechanical stresses acting on the metal braided sheathing in the inlet area of the clamping sleeve will be further reduced. In a preferred embodiment the plastic material is polyoxymethylene with a high content of magnesium silicate. Polyethylene with corresponding additives, if required, is also a well suited plastic material.

Further modified embodiments of the clamping sleeve according to the invention comprise a base member with a circumferential projection protruding radially outward, the outer circumferential surface of which is knurled and which is encompassed by the plastic insert. These embodiments are particularly advantageous with a plastic insert molded to the base member of the clamping sleeve and result in a very reliable fit in or at, respectively, the base member.

In the case of other embodiments of the clamping sleeve according to the invention the plastic insert is not molded to the base member but inserted, pushed or pressed, respectively, into same.

An embodiment of the inventive ready for use pressure hose with a braided metal sheathing is characterized in that the clamping sleeve is crimped with the fitting only along an axial portion into which the plastic insert does not extend. This prevents a deterioriation of the friction-lowering effect of the plastic insert because the inner surface of the plastic insert is forced into the metal braided sheathing of the pressure hose where it forms a positive engagement between the metal braided sheathing and the plastic insert.

In a modified embodiment of the pressure hose according to the invention, the axial portion of the clamping sleeve in which the axial end portion of the plastic insert is arranged is also crimped with the fitting. This results, in a defined area, in the just described and actually to be prevented positive engagement between the plastic insert and the metal braided sheathing, which provides for a particularly reliable fit of the metal braided sheathing and effects a limited degree of pull-relief with respect to the sealing connection and thus further increases the life of a pressure hose of such a design.

An embodiment of a clamping sleeve according to the invention and an inventive pressure hose ready for use will be explained in detail in the following with reference to schematic drawings in which.

Figure 1:
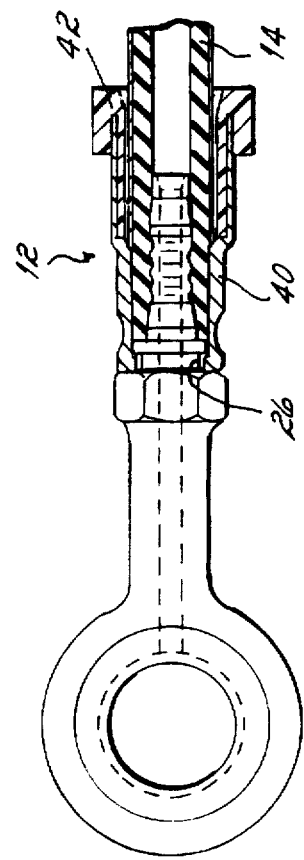
FIG. 1 shows the connecting area of a ready for use pressure hose with metal braided sheathing according to the invention as a partial longitudinal section, with the condition prior to crimping the clamping sleeve being illustrated.
Figure 2:
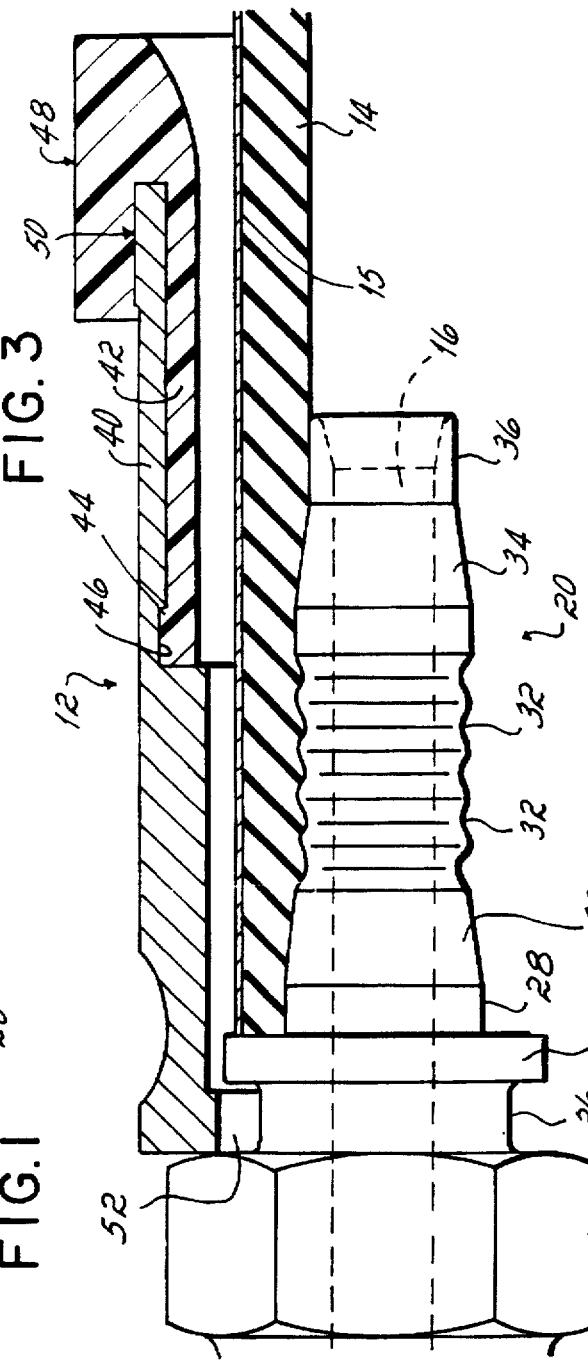
FIG. 2 shows an enlarged part of the view in FIG. 1.

FIGS. 1 and 2 show a fitting 10 to which a pressure hose 14 with a metal braided sheathing is to be attached by means of a clamping sleeve 12. The illustrated fitting 10 is formed as a ring nipple as is used for connecting a brake fluid hose which runs from the master cylinder arranged at the handlebar of a motorcycle to the front wheel brake of the motorcycle. The ring nipple is secured at the front wheel brake by means of a hollow bolt (not shown) and, via the pressure hose 14, provides for a fluid connection between a brake piston arranged in the brake and the master cylinder mounted at the handlebar. For this purpose, the ring nipple is provided with a through hole 16, which penetrates the ring nipple and opens into an annular duct 18. At its right hand side (FIG. 1) the ring nipple has a connecting stud 20 which is penetrated by the through hole 16, onto which the pressure hose 14 is slid up to a stop which is formed as an annular collar 22. Reference numeral 15 indicates the metal braided sheathing which is made of steel in this case.

The connecting stud 20 extends in an axial direction from an external hexagon 24 which is formed at the body of the ring nipple and whose function will be described later. From the external hexagon 24 onwards, the connecting stud 20 comprises, axially arranged one after the other, an annular groove 26, the already mentioned annular collar 22, a cylindrical section 28 of smaller diameter than the annular collar 22, a cone 30 which tapers axially towards the free right hand end (FIG. 1), another cylindrical section of smaller diameter relative to the section 28, in the outer circumferential surface of which apart from the end section adjacent to the free end a plurality of successive grooves 32 are formed, another cone which is axially tapered towards the free end, and finally a cylindrical section 36 with a once more reduced diameter. The grooves 32 are made in such a manner that its concave portion including the groove bottom has a radius of 0.5 mm while the convex portions which connect the individual grooves 32 have a radius of 0.2 mm.

The clamping sleeve 12 which in the illustrated embodiment is approximately 1.5 times as long as the connecting stud 20 is arranged concentrically to the connecting stud 20 and completely encompasses same as well as an end section 38 of the pressure hose 14. It consists of a tubular metal base member 40 which, in the area remote from the fitting 10 which is formed as a ring nipple, is provided with a hollow cylindrical plastic insert 42 which in the illustrated embodiment extends axially approximately from the centre of the base member 40 to the end of the base member 40 remote from the fitting 10, which in the following is referred to as inlet end. In order to accommodate the plastic insert 42 the base member 40 has an inner diameter along the section intended for this purpose which is larger than that of its section axially adjacent to the plastic insert 42 being on the left hand side in FIG. 1.

The inner diameter of the plastic insert 42 beginning from its axially inner end is slightly larger than the inner diameter of the section of the base member 40 axially adjacent to the plastic insert 42. At its axially inner end, the plastic insert 42 has a radially outwardly protruding circumferential projection 44 which engages a correspondingly shaped annular groove 46 formed in the inner surface of the base member 40. At its opposite axially outer end, the plastic insert 42 has a flange which is formed as an external hexagon 48 and which encompasses the inlet end of the base member 40 and an end section thereof. The inner diameter of the plastic insert 42 continuously increases in an outward direction in the area in which the external hexagon 48 is formed so that the through hole extending through the plastic insert 42 assumes an approximately bell-shaped form in the axially outer end section.

The end section of the base member 40 which is encompassed by the plastic insert 42 comprises a circular cylindrical projection 50 extending radially outwards the outer circumferential surface of which is knurled. Both this projection 50 as well as the annular groove 46 formed inside the base member 40 serve to securely hold the plastic insert 42 which is molded to the base member 40 in the illustrated embodiment. Alternatively, the plastic insert 42 can also be pushed or pressed into the base member 40 in which case the knurled projection 50 at the base member 40 can be omitted.

The plastic insert 42 consists of polyoxymethylene with a high proportion of magnesium silicate which is added to the plastic material in order to further reduce the friction between the plastic insert 42 und the metal braided sheathing of the pressure hose 14. Another suitable material for the plastic insert 42 is polyethylene.

Figure 3:
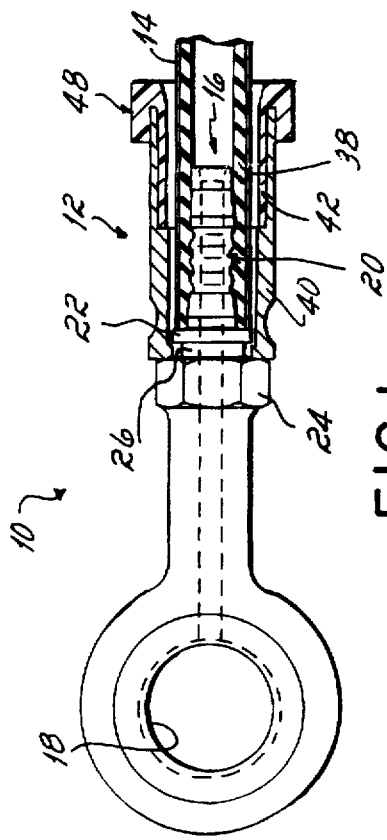
FIG. 3 shows the view of FIG. 1, but with the clamping sleeve in radially crimped condition.

FIG. 3 shows the clamping sleeve 12 in a condition in which it is crimped together with the fitting 10. It can be seen from FIG. 3 that the clamping sleeve 12 has been radially crimped in only that area into which the plastic insert does not extend. The crimping operation causes the end section 38 to be sealingly pressed against the connecting stud 20 and the end of the clamping sleeve 12 or its base member 40, respectively, to be pressed into the annular groove 26 which is formed between the external hexagon 24 and the annular collar 22. In order to ensure that the crimped clamping sleeve 12 is held on the fitting 10 as securely as possible, the end of the base member 40 which is pressed into the annular groove is provided with a radially inwardly protruding circumferential collar 52 which after crimping forms a positive connection with the annular collar 22. Due to the fact that the axial section of the base member 40 in which the plastic insert 42 is arranged is not crimped, it is ensured on the one hand that no positive connection which would increase the friction between the metal braided sheathing of the pressure hose and the plastic insert 42 occurs between the surfaces of the metal braided sheathing and the plastic insert 42 facing each other and, on the other hand, it is precluded that the external hexagon 48 formed at the plastic insert 42 is deformed.

Together with the external hexagon 24 formed at the fitting 10, the external hexagon 48 serves to simplify a rotation of the fitting 10 with respect to the pressure hose 14 which has already been brought into a sealing contact by means of the clamping sleeve 12. Such a rotation of the fitting 10 with respect to the pressure hose 14 is often necessary in order to adapt a pressure hose ready for use to the prevailing installation situation and thereby prevent a rotation of the pressure hose in itself which would adversely affect the life of the pressure hose.

I claim:

1. A clamping sleeve (12) for joining a pressure hose (14) having a braided metal sheathing with a fitting (10) having a connecting stud (20) adapted to receive said pressure hose (14) in a sliding-on fashion, the clamping sleeve (12) comprising a tubular metal base member (40) having an end facing towards said fitting (10) and having an opposite inlet end, the length of the clamping sleeve (12) being sufficient to fully surround the connecting stud (20), characterised in that the base member (40) is provided, at least in the region of the inlet end, with an essentially tubular plastic insert (42) extending at least to the inlet end of the base member (40), wherein the inner diameter of an axially inner end portion of the plastic insert (42) corresponds at least essentially to the inner diameter of a portion of the base (40) which extends axially adjacent to the plastic insert (42), and wherein the inner diameter of an axially outer end portion of the plastic insert (42) constantly increases up to the axially outer end.

2. A clamping sleeve according to claim 1, characterised in that the inner diameter of the plastic insert (42) is slightly larger at its axially inner end portion than the inner diameter of the portion of the base member (40) which extends axially adjacent to the plastic insert (42).

3. A clamping sleeve according to claim 1, characterised in that the plastic insert (42) at its axially inner end portion comprises a circumferential projection (44) which extends radially outward and which engages a correspondingly shaped annular groove (46) formed in the inner surface of the base member (40).

4. A clamping sleeve according to claim 1, characterised in that the plastic insert (42) encompasses the inlet end of the base member (40).

5. A clamping sleeve according to claim 4, characterised in that the axially outer end of the plastic insert (42) is formed as an external hexagon (48).

6. A clamping sleeve according to claim 1, characterised in that the plastic insert (42) consists of a plastic material which contains inorganic fillers or pigments.

7. A clamping sleeve according to claim 6, characterised in that the plastic material is polyoxymethylene and has a high proportion of magnesium silicate.

8. A clamping sleeve according to claim 1, characterised in that the metal base member (40) comprises a circumferential projection (50) which extends radially outwards, the outer circumferential surface of which is knurled, and which is encompassed by the plastic insert (42).

9. A clamping sleeve according to claim 1, characterised in that the plastic insert (42) is pressed into the base member (40).

10. A clamping sleeve according to claim 1, characterised in that the plastic insert (42) is injection-moulded to the base member (40).

11. A clamping sleeve according to claim 1 including a pressure hose with metal braided sheathing, characterised in that the pressure hose (14) is positioned over with the stud (20) of fitting (10) a clamping sleeve (12) is crimped with the fitting to compress the hose against the stud (20).

12. A clamping sleeve and pressure hose according to claim 11, characterised in that the clamping sleeve (12) is crimped with the fitting (10) only along an axial portion thereof into which the plastic insert (42) does not extend.

13. A clamping sleeve and pressure hose according to claim 12, characterised in that the axial portion of the clamping sleeve (12) in which the axially inner end portion of the plastic insert (42) is arranged is crimped with the fitting (10) also.

14. A clamping sleeve (12) for joining a pressure hose (14) having a braided metal sheathing with a fitting (10) having a connecting stud (20) adapted to receive said pressure hose (14) in a sliding-on fashion, the clamping sleeve (12) comprising a tubular metal base member (40) having an end facing towards said fitting (10) and having an opposite inlet end, the length of the clamping sleeve (12) being sufficient to fully surround the connecting stud (20), characterised in that the base member (40) is provided, at least in the region of the inlet end, with an essentially tubular plastic insert (42) extending at least to the inlet end of the base member (40), wherein the inner diameter of an axially inner end portion of the plastic insert (42) in the uncrimped condition of the clamping sleeve (12) corresponds at least essentially to the inner diameter of a portion of the base member (40) which extends axially adjacent to the plastic insert (42), and wherein the inner diameter of an axially outer end portion of the plastic insert (42) constantly increases up to the axially outer end.

15. A clamping sleeve according to claim 14, characterised in that the inner diameter of the plastic insert (42) is slightly larger at its axially inner end portion than the inner diameter of the portion of the base member (40) which extends axially adjacent to the plastic insert (42).

* * * * *